(12) United States Patent
Odendall

(10) Patent No.: US 7,725,280 B2
(45) Date of Patent: May 25, 2010

(54) METHOD FOR CHECKING THE LAMBDA VALUE INDICATED BY A BINARY LAMBDA PROBE

(75) Inventor: Bodo Odendall, Lenting (DE)

(73) Assignee: Audi AG, Ingolstadt (DE)

( * ) Notice: Subject to any disclaimer, the term of this patent is extended or adjusted under 35 U.S.C. 154(b) by 229 days.

(21) Appl. No.: 11/979,680

(22) Filed: Nov. 7, 2007

(65) Prior Publication Data
US 2008/0110234 A1 May 15, 2008

(30) Foreign Application Priority Data
Nov. 10, 2006 (DE) .................. 10 2006 053 110

(51) Int. Cl.
*G01D 18/00* (2006.01)
(52) U.S. Cl. ........................................... 702/104
(58) Field of Classification Search .................. 702/104
See application file for complete search history.

(56) References Cited

U.S. PATENT DOCUMENTS 5,140,535 A * 8/1992 Raff et al. .................. 702/104

2006/0047468 A1 * 3/2006 Aoki .......................... 702/132

FOREIGN PATENT DOCUMENTS

| DE | 195 48 071 | 7/1996 |
|---|---|---|
| DE | 197 22 334 | 12/1998 |
| EP | 1 092 086 | 6/1999 |

* cited by examiner

*Primary Examiner*—Bryan Bui
*Assistant Examiner*—Jonathan Teixeira Moffat
(74) *Attorney, Agent, or Firm*—Novak Druce & Quigg LLP

(57) ABSTRACT

In a method for checking the lambda value λ indicated by a binary lambda probe, the lambda probe being situated in the exhaust line of an internal combustion engine and provided downstream from a catalyst having oxygen storage capacity, the invention provides that the time progression of the voltage signal $U_\lambda$ is plotted in the range of the lambda value $\lambda_{actual}$ of 1.0 indicated by the lambda probe until a first inflection point $W_1$ and a second inflection point $W_2$ of the voltage signal $U_\lambda$ have been detected, the time derivative $dU_\lambda/dt$ of the voltage signal is generated, the jumps $S_1$, $S_2$ in the time derivative $dU_\lambda/dt$ which occur at the inflection points $W_1$, $W_2$ are compared to one another, and based on the comparison of the jumps $S_1$, $S_2$ the indicated lambda value $\lambda_{actual}$ of 1.0 is checked. According to the invention, the actual lambda value $\lambda_{target}$ of 1.0 is always maintained in the air/fuel mixture supplied to the internal combustion engine in order to ensure optimal conversion C of pollutants in the exhaust gas from the internal combustion engine.

7 Claims, 4 Drawing Sheets ns (NO_x) by means of the lambda value $\lambda$;

METHOD FOR CHECKING THE LAMBDA VALUE INDICATED BY A BINARY LAMBDA PROBE

CROSS-REFERENCE TO RELATED APPLICATIONS

This application claims priority from German Application No. 102006053110.8 filed Nov. 10, 2006, hereby incorporated by reference in its entirety.

The present invention relates to a method for checking the lambda value indicated by a binary lambda probe, the lambda probe being situated in the exhaust line of an internal combustion engine and provided downstream from a catalyst having oxygen storage capacity.

BACKGROUND OF THE INVENTION

For optimal conversion of pollutants contained in the exhaust gas of an internal combustion engine, namely hydrocarbons (HC) and carbon monoxide (CO) by means of oxidation and nitrogen oxides ($NO_x$) by means of reduction, the objective is to maintain a lambda value of 1.0 for the air/fuel ratio supplied to an internal combustion engine. This lambda value is specified by a binary lambda probe, situated downstream from the catalyst, which operates as a pilot probe. However, the accuracy of the specification is influenced by various parameters such as aging of the lambda probe, the quality of the fuel supplied to the internal combustion engine, and the catalyst temperature. These deviations are not linear, however, and are therefore difficult to correct.

In light of the foregoing, the object of the present invention is to provide a method for checking the lambda value indicated by a binary lambda probe, in which the deviations between the indicated lambda value and the actual lambda value are determined, and on the basis thereof the lambda value indicated by the lambda probe may be corrected.

SUMMARY OF THE INVENTION

This object is achieved by the fact that the time progression of the voltage signal is plotted in the range of the lambda value of 1.0 indicated by the lambda probe until a first inflection point and a second inflection point of the voltage signal have been detected, the time derivative of the voltage signal is generated, and the jumps in the time derivative which occur at the inflection points are then compared to one another, and, based on the comparison of the jumps, the indicated lambda value of 1.0 is checked.

At approximately 0.6 volt, the voltage signal from the binary lambda probe is in the range of the lambda value of 1.0, and on account of its pilot function migrates in alternation from slightly higher voltage values up to approximately 0.7 volt to slightly lower voltage values down to approximately 0.5 volt, thereby forming upper and lower inflection points in the time progression of the voltage signal. The time derivative of the voltage signal indicates the slope thereof, so that the derivative represents a positive or negative jump in the region of the inflection points. The algebraic sign and the magnitude of the jumps characterize the inflection points, and in relation to one another allow the lambda value of 1.0 indicated by the voltage signal to be checked.

When the comparison shows that both jumps in the time derivative are symmetrical relative to one another, i.e., their magnitudes are equal, the indicated lambda value of 1.0 corresponds to the actual lambda value of 1.0.

On the other hand, when the comparison shows that both jumps in the derivative are asymmetrical relative to one another, i.e., their magnitudes are unequal, the indicated lambda value of 1.0 does not correspond to the actual lambda value of 1.0.

Furthermore, when the comparison shows that both jumps in the time derivative are asymmetrical relative to one another, i.e., their magnitudes are unequal, and the magnitude of the negative jump is greater than the magnitude of the positive jump, the indicated lambda value of 1.0 is greater than the actual lambda value of 1.0.

Alternatively, when the comparison shows that both jumps in the time derivative are asymmetrical relative to one another and the magnitude of the negative jump is less than the magnitude of the positive jump, the indicated lambda value of 1.0 is less than the actual lambda value of 1.0. The asymmetry indicates that the voltage signal from the lambda probe is undergoing fluctuations of unequal magnitude for greater or smaller voltages. It may therefore be assumed that the actual lambda value is not 1.0, i.e., that ideal exhaust gas conversion is not occurring, and also that the oxygen storage capacity of the catalyst is not 50%.

The inflection points of the voltage signal are preferably plotted for an oxygen storage capacity of an upstream catalyst of approximately 50%. Specifically, an oxygen storage capacity at the midpoint level indicates that the voltage signal from the lambda probe is subject to the least fluctuations, so that the inflection points are very prominent. This is particularly advantageous for carrying out the present method.

A method for correcting the lambda value indicated by a binary lambda probe is also advantageously provided, characterized in that, based on the check of the indicated lambda value, the indicated lambda value of 1.0 is corrected to the actual lambda value of 1.0. As a result, conversion, i.e., oxidation as well as reduction of pollutants contained in the exhaust gas, is possible only when the actual lambda value is 1.0.

It is particularly practical for the correction to be made based on the difference in magnitudes resulting from the comparison of the two jumps.

BRIEF DESCRIPTION OF THE DRAWINGS

The present invention is explained in greater detail with reference to the following drawing figures, which show the following.

DETAILED DESCRIPTION OF EMBODIMENTS OF THE INVENTION

Figure 1:
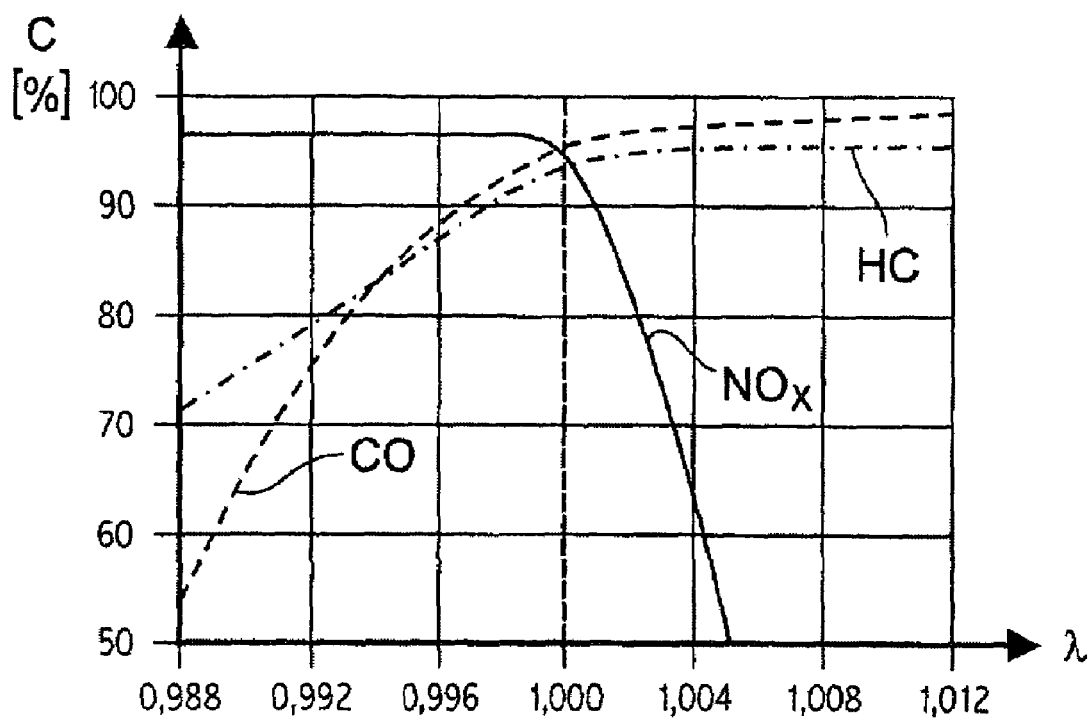
FIG. 1 shows a diagram of the pollutant conversion by means of the lambda value.

FIG. 1 illustrates the conversion C of the pollutants hydrocarbons (HC), carbon monoxide (CO), and nitrogen oxides (NO$_x$) by means of the air/fuel ratio, i.e., the lambda value λ. In order to achieve optimal conversion of all these pollutants, it must be possible for oxidation as well as reduction to take place, so that in the ideal case a lambda value λ of 1.0 is specified so that neither of the two reactions is suppressed.

Figure 2:
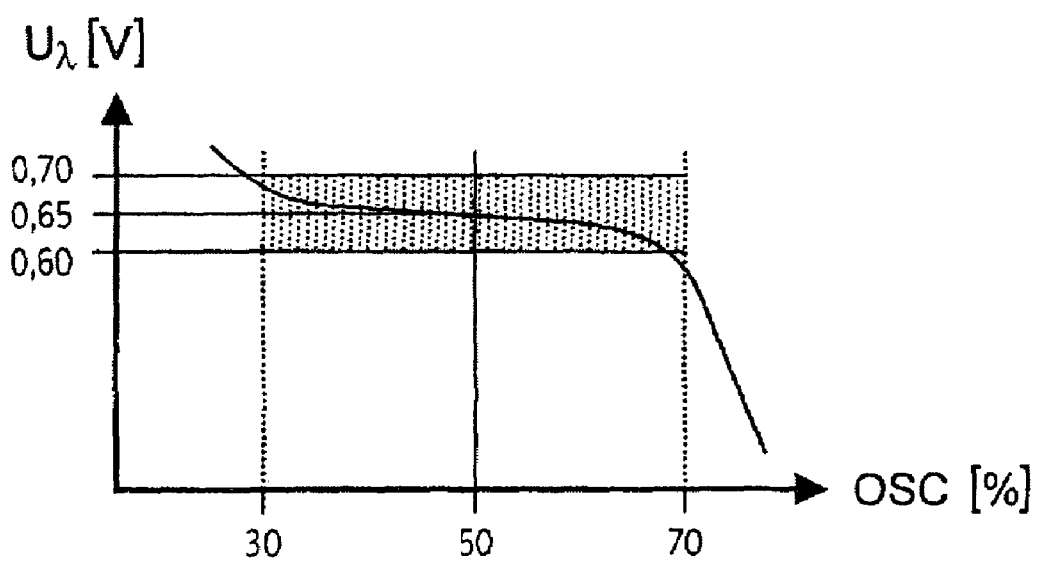
FIG. 2 shows a diagram of the pollutant conversion by means of the oxygen storage capacity of a catalyst.

FIG. 2 shows the value of the voltage signal U$_λ$ from a lambda probe situated in the exhaust line of an internal combustion engine and provided downstream from a catalyst, by means of the percentage of oxygen storage capacity OSC of the catalyst. This figure illustrates that the voltage signal U$_λ$ shows the least fluctuation at a midpoint oxygen storage capacity OSC of the catalyst of 50%, i.e., within a range of 30 to 70%.

Figure 3A:
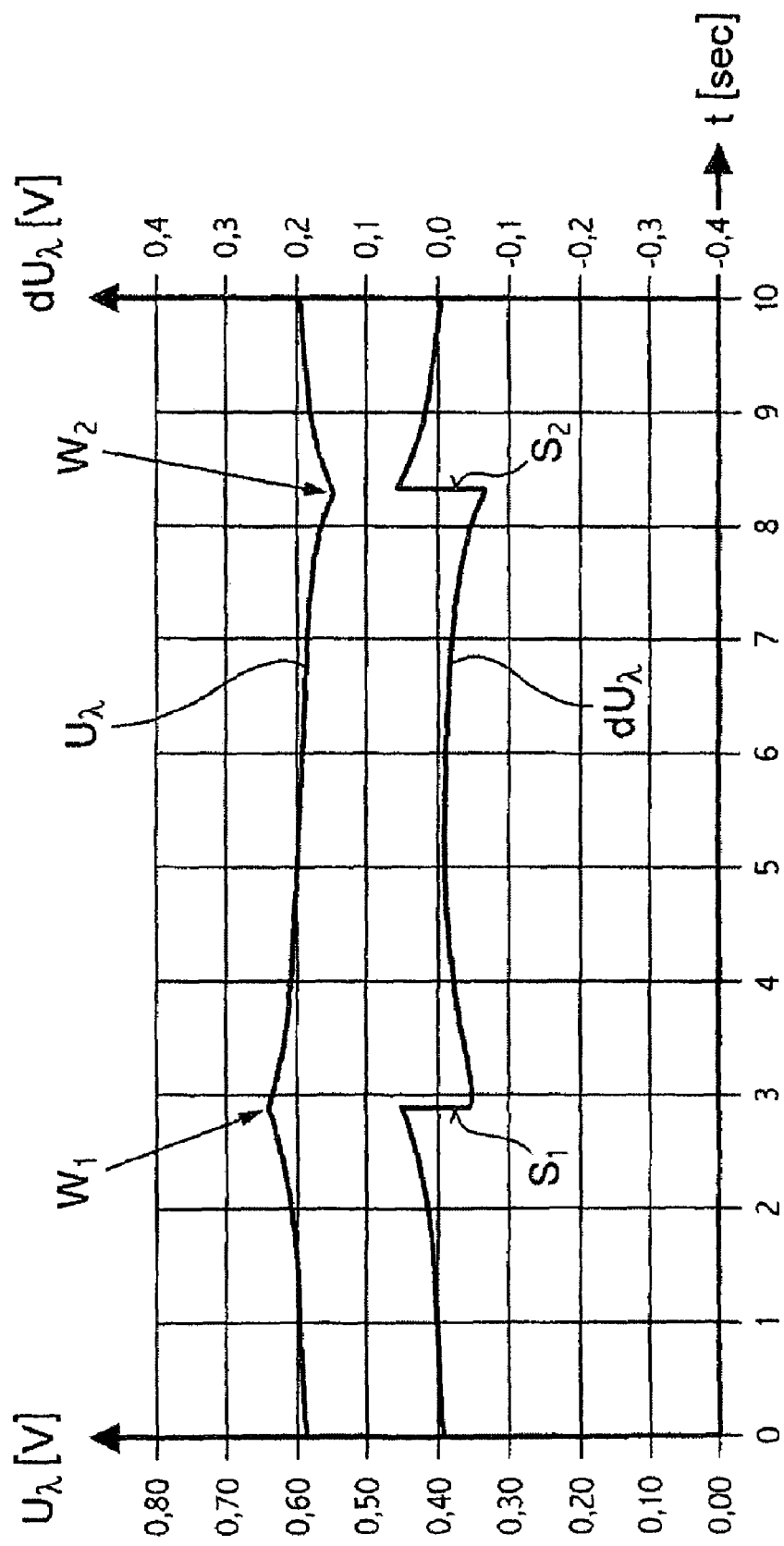
FIG. 3a shows a first illustration of the time progression of the voltage signal from a lambda probe, and the time derivative thereof for an indicated lambda value of 1.0 which corresponds to an actual lambda value of 1.0.
Figure 3B:
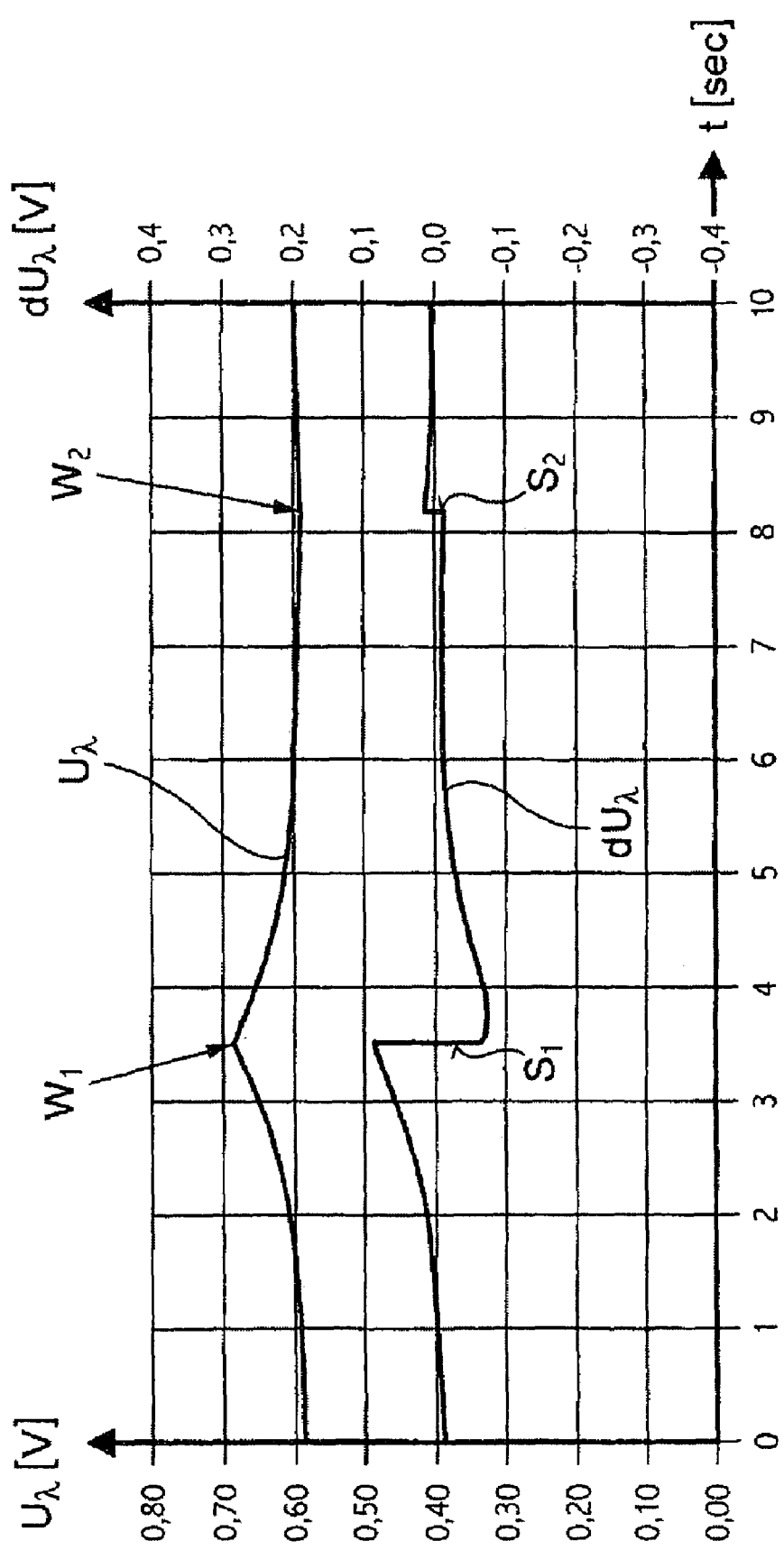
FIG. 3b shows a second illustration of the voltage signal from the lambda probe, and the time derivative for an indicated lambda value of 1.0 which is greater than the actual lambda value of 1.0.
Figure 3C:
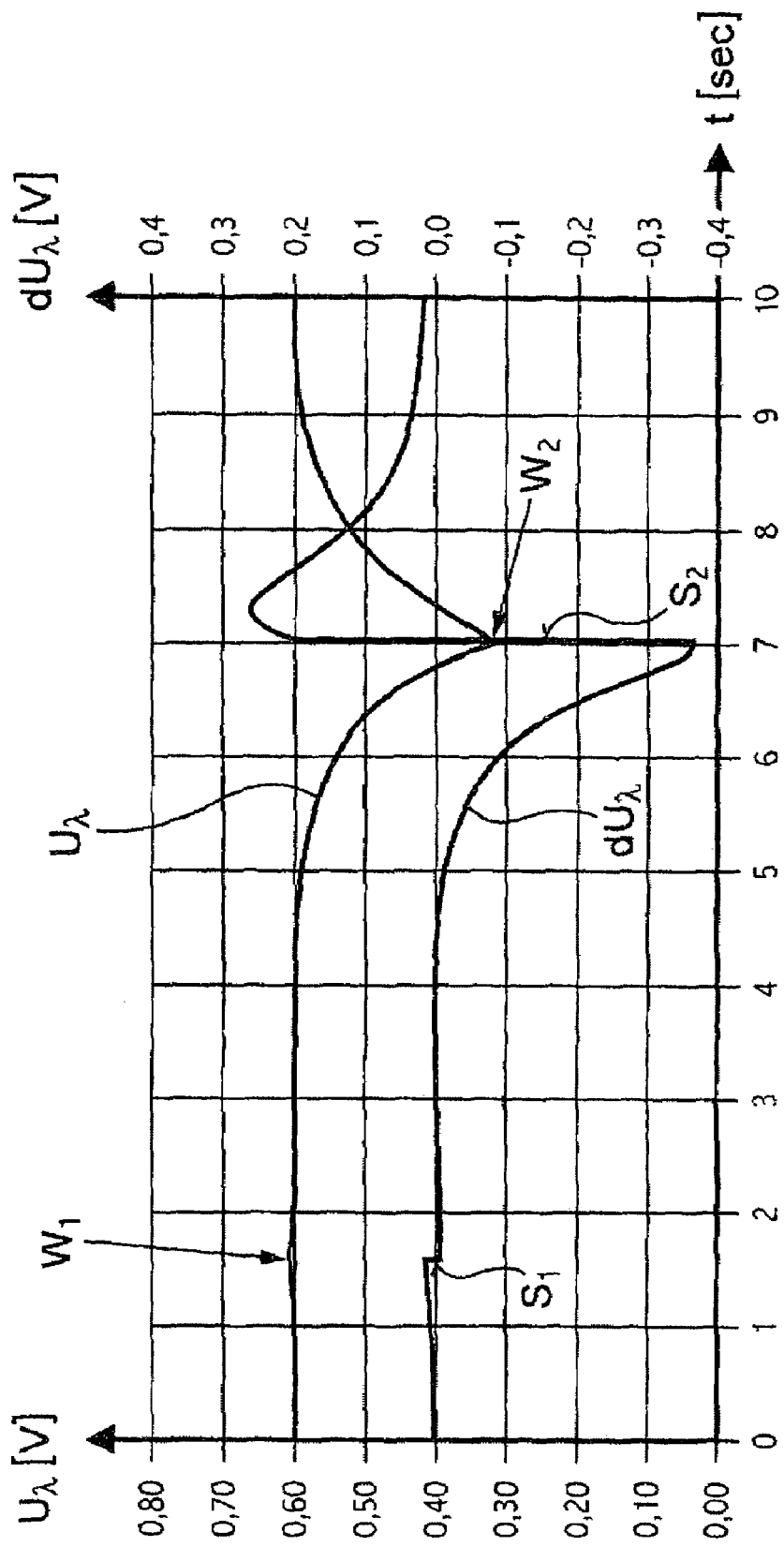
FIG. 3c shows a third illustration of the voltage signal, and the derivative for an indicated lambda value of 1.0 which is less than the actual lambda value of 1.0.

FIGS. 3a, 3b, and 3c show various time progressions of the voltage signal U$_λ$ and the first time derivatives dU$_λ$/dt thereof. All voltage signals U$_λ$ show a first upper inflection point W$_1$ and a second lower inflection point W$_2$. These inflection points W$_1$, W$_2$ are produced as the result of more or less small fluctuations in the lambda probe, which operates with a pilot function. The derivative of the voltage signal dU$_λ$/dt represents the slope thereof, and thus shows a negative jump S$_1$ or a positive jump S$_2$ at the first inflection point W$_1$ and second inflection point W$_2$, respectively, the algebraic sign and the magnitude of the jumps S$_1$, S$_2$ characterizing the associated respective inflection point W$_1$, W$_2$ of the voltage signal U$_λ$.

The first illustration from FIG. 3a shows that the voltage signal U$_λ$ first passes through an upper inflection point W$_1$ and then a lower inflection point W$_2$. Both inflection points W$_1$, W$_2$ are equally prominent, which is confirmed by the evaluation of the time derivative dU$_λ$/dt, i.e., by a comparison of the jumps S1$_1$, S$_2$ in the derivative occurring at the inflection points W$_1$, W$_2$. This is because these jumps S$_1$, S$_2$ have different algebraic signs but equal magnitudes. In other words, the lambda value λ$_{actual}$ of 1.0 indicated by the lambda probe corresponds to the actual lambda value λ$_{target}$ of 1.0.

The second illustration from FIG. 3b shows once again that the voltage signal U$_λ$ passes through two inflection points W$_1$, W$_2$, the first upper inflection point W$_1$ being more prominent than the second inflection point W$_2$, as confirmed by the evaluation of the time derivative dU$_λ$/dt. The magnitude of the first negative jump S$_1$ associated with the first inflection point W$_2$ is much greater than the second positive jump S$_2$ associated with the second inflection point W$_2$. The comparison, i.e., the difference, of these magnitudes of jumps S$_1$, S$_2$ shows that the lambda value λ$_{actual}$ of 1.0 indicated by the lambda probe is greater than the actual lambda value λ$_{target}$ of 1.0, the rate of the deviation being obtained from the difference in the magnitudes.

Lastly, the third illustration from FIG. 3c also shows that the voltage signal U$_λ$ passes through two inflection points W$_1$, W$_2$, the first upper inflection point W$_1$ being less prominent than the second lower inflection point W$_2$. This is confirmed by the derivative dU$_λ$/dt of the voltage signal, and the comparison of the jumps S$_1$, S$_2$ in the derivative dU$_λ$/dt clearly shows that the lambda value λ$_{actual}$ of 1.0 indicated by the lambda probe is less than the actual lambda value λ$_{target}$ of 1.0, the rate of the deviation being obtained once again from the difference in the magnitudes.

The rate of deviation resulting from the comparison of the jumps S$_1$, S$_2$ may be used to correct the lambda value λ, so that the internal combustion engine is always operated in an optimal manner at the actual lambda value λ of 1.0 in order to achieve a particularly advantageous conversion C, i.e., simultaneous oxidation and reduction of the pollutants HC, CO, and NO$_x$ contained in the exhaust gas.

List of Reference Numerals:
C Conversion
λ Lambda value
OSC Oxygen storage capacity
U$_λ$ Voltage signal
dU$_λ$/dt Derivative of the voltage signal
W$_1$, W$_2$ Inflection point
S$_1$, S$_2$ Jump
λ$_{actual}$ Indicated lambda value
λ$_{target}$ Actual lambda value

The invention claimed is:

1. A method for checking the lambda value indicated by a binary lambda probe, the lambda probe being situated in the exhaust line of an internal combustion engine and provided downstream from a catalyst having oxygen storage capacity, comprising:
    plotting the time progression of the voltage signal in the range of the actual lambda value of 1.0 indicated by the lambda probe until a first inflection point and a second inflection point of the voltage signal have been detected;
    generating a signal corresponding to the time derivative of the voltage signal;
    comparing the jumps in the time derivative which occur at the inflection points to one another; and
    checking the indicated lambda value of 1.0 based on the comparison of the jumps.

2. The method according to claim 1, wherein
    when the comparison shows that both jumps in the time derivative are symmetrical relative to one another, the indicated actual lambda value of 1.0 corresponds to the actual lambda value of 1.0; and
    when the comparison shows that both jumps in the derivative are asymmetrical relative to one another, the indicated lambda value of 1.0 does not correspond to the actual lambda value of 1.0.

3. The method according to claim 2, wherein
    when the comparison shows that both jumps in the time derivative are asymmetrical relative to one another and the magnitude of the negative jump is greater than the magnitude of the positive jump, the indicated lambda value of 1.0 is greater than the actual lambda value of 1.0; and
    when the comparison shows that both jumps in the time derivative are asymmetrical relative to one another and the magnitude of the negative jump is less than the magnitude of the positive jump, the indicated lambda value of 1.0 is less than the actual lambda value of 1.0.

4. The method according to claim 1 wherein the rate of the deviation of the indicated lambda value of 1.0 relative to the actual lambda value of 1.0 is obtained from the difference in magnitudes resulting from the comparison of the two jumps.

5. The method according to claim 1 wherein the two inflection points of the voltage signal are plotted at an oxygen storage capacity of the catalyst of approximately 50%.

6. A method for correcting the lambda value indicated by a binary lambda probe, based on the check of the indicated lambda value according to claim 1 wherein the indicated lambda value of 1.0 is corrected to the actual lambda value of 1.0.

7. The method according to claim 6 wherein the correction is made based on the difference in magnitudes resulting from the comparison of the two jumps.

* * * * *